(12) United States Patent
Liang et al.

(10) Patent No.: US 9,529,384 B1
(45) Date of Patent: Dec. 27, 2016

(54) ELECTRONIC DEVICE

(71) Applicant: WISTRON CORP., New Taipei (TW)

(72) Inventors: Chen-Yi Liang, New Taipei (TW);
Che-Wen Liu, New Taipei (TW);
I-Chun Chen, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 14/983,186

(22) Filed: Dec. 29, 2015

(30) Foreign Application Priority Data

Sep. 16, 2015 (TW) .............................. 104130542 A

(51) Int. Cl.
*H05K 7/00* (2006.01)
*H05K 5/00* (2006.01)
*G06F 1/16* (2006.01)

(52) U.S. Cl.
CPC ........... *G06F 1/1616* (2013.01); *G06F 1/1624* (2013.01); *G06F 1/1679* (2013.01)

(58) Field of Classification Search
CPC ................................ H05K 5/02; A47B 23/042

USPC ........................................ 361/679.01–679.21
See application file for complete search history.

(56) References Cited

U.S. PATENT DOCUMENTS

| | | | | |
|---|---|---|---|---|
| 2011/0025176 A1* | 2/2011 | McClure | .............. | A47B 23/042 312/223.2 |
| 2013/0329351 A1* | 12/2013 | Lin | ...................... | H05K 5/0239 361/679.27 |

* cited by examiner

*Primary Examiner* — Jerry Wu
(74) *Attorney, Agent, or Firm* — Maschoff Brennan

(57) ABSTRACT

An electronic device includes a main body, a display, a stand, a height-adjusting module and an angle-adjusting module. The display is slidably disposed on the main body. The stand pivots to the main body. The height-adjusting module is disposed on the main body and connected to the display. The angle-adjusting module includes a first sliding element, a linkage, two angle-adjusting transmission units and an angle-adjusting motor. The first sliding element is slidably disposed on the main body. Two opposite ends of the linkage are pivoted to the first sliding element and the stand. The two angle-adjusting transmission units are disposed on the main body and the first sliding element, and engaged with each other. The angle-adjusting motor is connected to the second angle-adjusting transmission unit.

21 Claims, 15 Drawing Sheets

US 9,529,384 B1

ELECTRONIC DEVICE

CROSS-REFERENCE TO RELATED APPLICATIONS

This non-provisional application claims priority under 35 U.S.C. §119(a) on Patent Application No(s). 104130542 filed in Taiwan, R.O.C. on Sep. 16, 2015, the entire contents of which are hereby incorporated by reference.

TECHNICAL FIELD

The disclosure relates to an electronic device, more particularly to an electronic device having a stand.

BACKGROUND

Desktop computers become more and more indispensable in business and home environments. However, a fully accessorized desktop computer occupies a large space and hard to be moved. In addition, the desktop computer needs to be equipped with an external display device for displaying, but the location for placing the external display device is restricted by a length of a cable connecting the desktop computer and the external display device. Accordingly, in order to decrease the space occupied by the desktop computer and improve the portability of the desktop computer, smaller and lighter computers, such as a notebook, a tablet and an AIO PC (all-in-one PC), which includes a display and a main body formed as a single body, are proposed.

Take the AIO PC as an example, the AIO PC includes a display and a main body which are fixed to each other. Users are able to control the AIO PC by touching the display. Besides, there is a stand disposed on the back of the AIO PC for supporting the AIO PC on a desk when the stand is unfolded. Thus, the users can adjust the tilt angle of the AIO PC by adjusting the stand. However, the AIO PC is still heavy so that the adjustment of the stand is also inconvenient for the users. Therefore, developers try to solve the problem that the adjustment of the stand is inconvenient.

SUMMARY

The present disclosure provides an electronic device which is convenient for the users to adjust tilt angles thereof.

One embodiment of the disclosure provides an electronic device including a main body, a display, a stand, at least one height-adjusting module and an angle-adjusting module. The display is slidably disposed on the main body. The stand is pivoted to the main body. The height-adjusting module is disposed on the main body and connected to the display for ascending and descending the display relative to the main body. The angle-adjusting module includes a first sliding element, a linkage, a first angle-adjusting transmission unit, a second angle-adjusting transmission unit and an angle-adjusting motor. The first sliding element is slidably disposed on the main body. Two opposite ends of the linkage are pivoted to the first sliding element and the stand, respectively. The first angle-adjusting transmission unit and the second angle-adjusting transmission unit are disposed on the main body and the first sliding element, respectively, and the first angle-adjusting transmission unit and the second angle-adjusting transmission unit are engaged with each other. The angle-adjusting motor is connected to the second angle-adjusting transmission unit. When the angle-adjusting motor slides the first sliding element relative to the main body through the first angle-adjusting transmission unit and the second angle-adjusting transmission unit, the linkage rotates the stand relative to the main body for adjusting an inclined angle between the stand and the main body.

One embodiment of the disclosure provides an electronic device including a main body, a display, a stand and an angle-adjusting module. The display is slidably disposed on the main body. The stand is pivoted to the main body. The angle-adjusting module includes a first sliding element, a linkage, a first angle-adjusting transmission unit, a second angle-adjusting transmission unit and an angle-adjusting motor. The first sliding element is slidably disposed on the main body. Two opposite ends of the linkage are pivoted to the first sliding element and the stand, respectively. The first angle-adjusting transmission unit and the second angle-adjusting transmission unit are disposed on the main body and the first sliding element, respectively, and the first angle-adjusting transmission unit and the second angle-adjusting transmission unit are engaged with each other. The angle-adjusting motor is connected to the second angle-adjusting transmission unit. When the angle-adjusting motor slides the first sliding element relative to the main body through the first angle-adjusting transmission unit and the second angle-adjusting transmission unit, the linkage rotates the stand relative to the main body for adjusting an inclined angle between the stand and the main body.

According to the electronic device as discussed above, the angle-adjusting module is able to adjust the inclined angle between the stand and the main body, and the height-adjusting module is able to ascend and descend the display. Therefore, the angle-adjusting module and the height-adjusting module improve the convenience of adjusting the stand and help the users to use the electronic device with a comfortable way.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DETAILED DESCRIPTION

Figure 1:
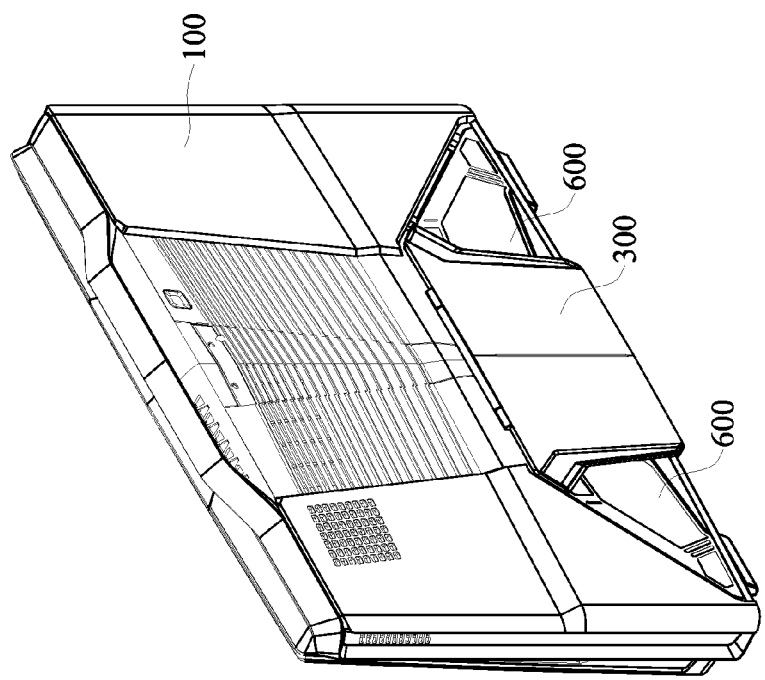
FIG. 1 is a perspective view of an electronic device according to an embodiment of the disclosure.
Figure 1:
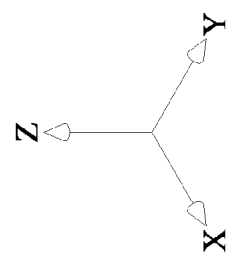

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
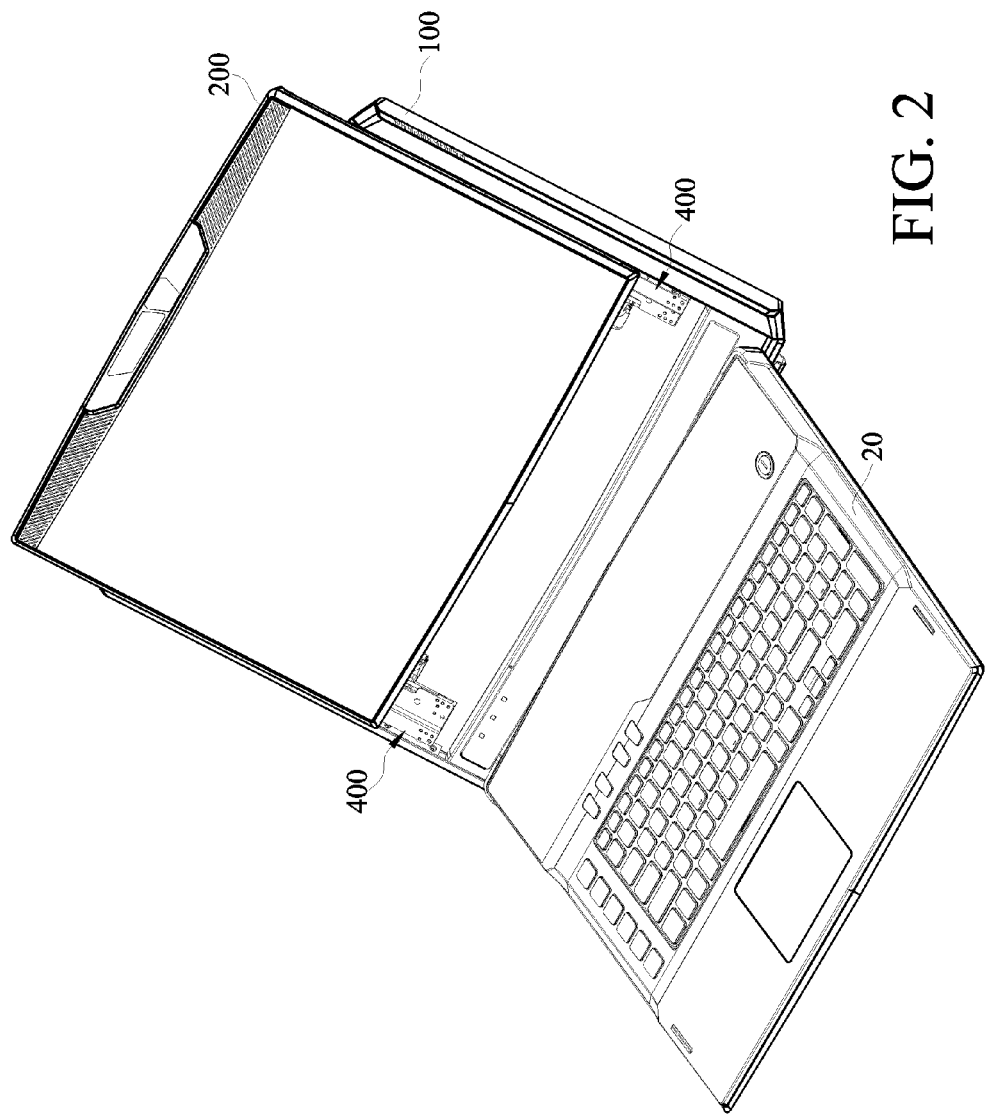
FIG. 2 is a perspective view of the electronic device shown in FIG. 1 being opened.
Figure 3:
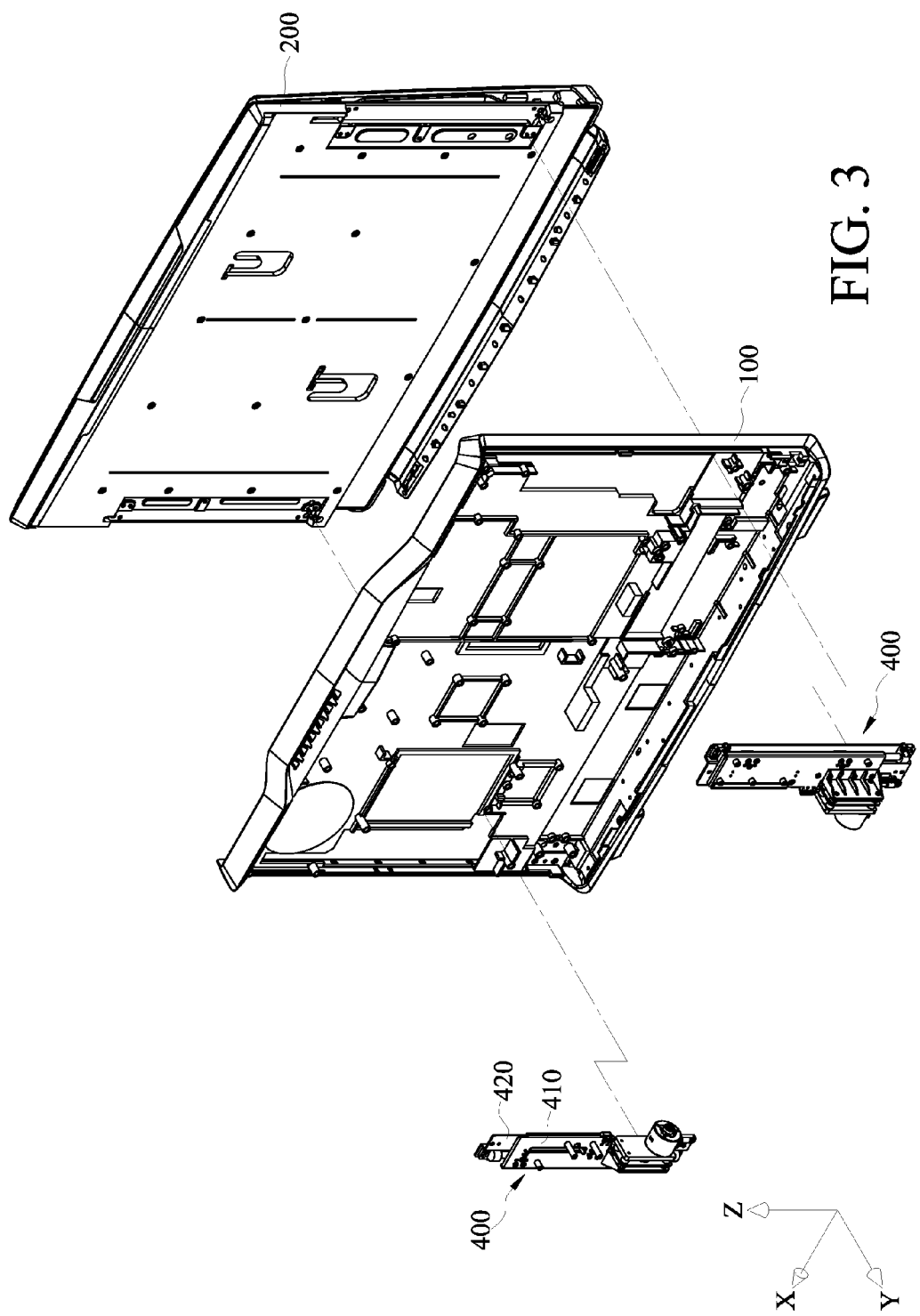
FIG. 3 is an exploded view of a main body, a display and a height-adjusting module shown in FIG. 2.
Figure 4:
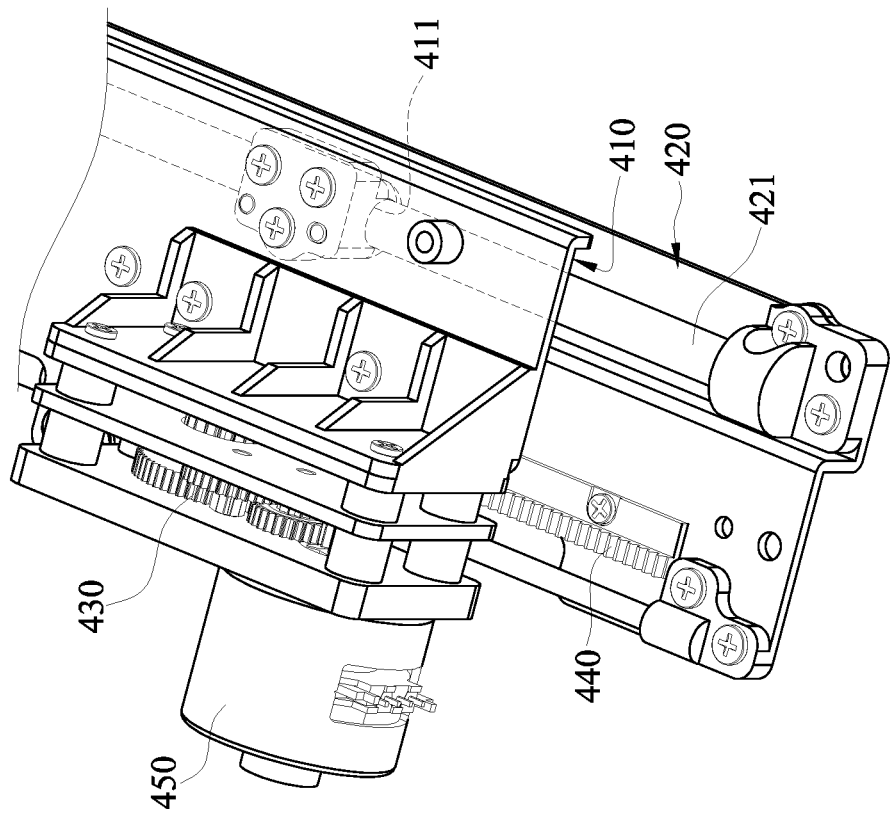
FIG. 4 is an enlarged view of the height-adjusting module shown in FIG. 3.
Figure 5:
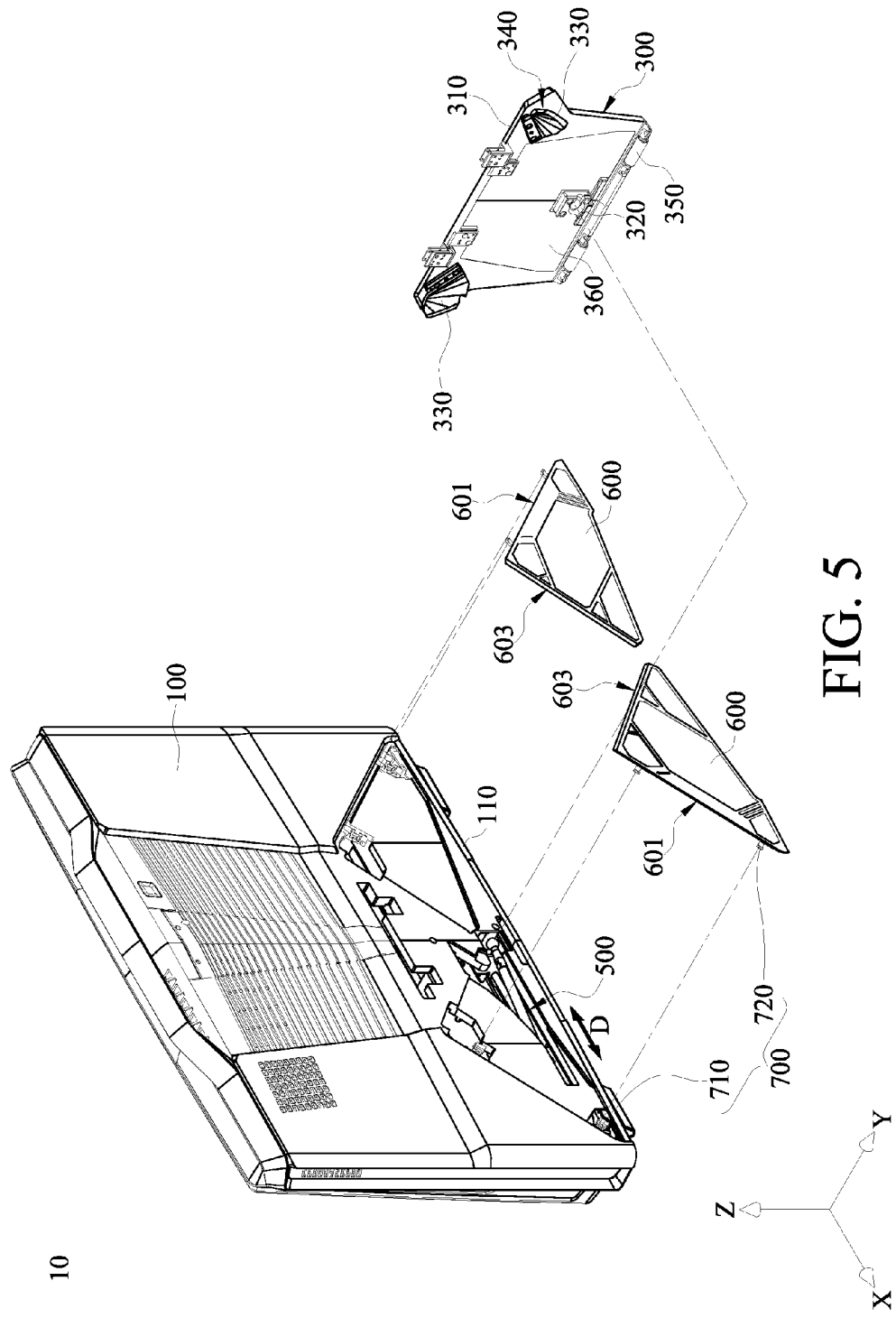
FIG. 5 is an exploded view of the main body, a stand and two covers of the electronic device shown in FIG. 1.

Please refer to FIG. 1 to FIG. 5. FIG. 1 is a perspective view of an electronic device according to an embodiment of the disclosure. FIG. 2 is a perspective view of the electronic device shown in FIG. 1 being opened. FIG. 3 is an exploded view of a main body, a display and a height-adjusting module shown in FIG. 2. FIG. 4 is an enlarged view of the height-adjusting module shown in FIG. 3. FIG. 5 is an exploded view of the main body, a stand and two covers of the electronic device shown in FIG. 1.

This embodiment provides an electronic device 10 including a main body 100, a display 200, a stand 300, two height-adjusting modules 400 and an angle-adjusting module 500. In addition, the electronic device 10 further includes two covers 600 and a plurality of pivoting mechanisms 700 corresponding to the two covers 600.

In this embodiment, electronic components such as a motherboard, a hard disk and an optical disc driver may be mounted inside the main body 100. Besides, as shown in FIG. 2, a keyboard 20 may be pivoted to a side of the main body 100, and a sound box (not shown) may be disposed on the top side of the keyboard 20. But the disclosure is not limited to the keyboard 20. In other embodiments, the keyboard 20 is omitted.

The display 200 is slidably disposed on the main body 100. When the main body 100 is folded relative to the keyboard 20, the display 200 is located between the main body 100 and the keyboard 20.

As shown in FIG. 3, the main body 100 and the display 200 are connected to each other via the two height-adjusting modules 400. The two height-adjusting modules 400 are able to ascend and descend the display 200 relative to the main body 100.

In details, as shown in FIG. 4, each of the two height-adjusting modules 400 includes a height-adjusting base 410, a second sliding element 420, a first height-adjusting transmission unit 430, a second height-adjusting transmission unit 440 and a height-adjusting motor 450. The two height-adjusting bases 410 are mounted on two opposite sides of the main body 100, respectively. Each of the two height-adjusting bases 410 has a plurality of height-adjusting guide slots 411. The second sliding elements 420 are mounted on two opposite sides of the display 200, respectively. Each of the two second sliding elements 420 has a plurality of height-adjusting guide rods 421. The plurality of height-adjusting guide rods 421 penetrate the plurality of height-adjusting guide slots 411, respectively, allowing the second sliding element 420 to slide relative to the height-adjusting base 410.

The first height-adjusting transmission unit 430 is a reduction gear mounted on the height-adjusting base 410. The second height-adjusting transmission unit 440 is a gear rack engaged with the reduction gear (first height-adjusting transmission unit 430) and mounted on the second sliding element 420.

The height-adjusting motor 450 is, for example a stepper motor, and is mounted on the height-adjusting base 410 and connected to the first height-adjusting transmission unit 430. The height-adjusting motor 450 is able to drive the second sliding element 420 to slide relative to the main body 100 through the first height-adjusting transmission unit 430 and the second height-adjusting transmission unit 440. Therefore, the height-adjusting motor 450 is able to drive the display 200 to ascend and descend relative to the main body 100. In this embodiment, the height-adjusting motor 450 is a stepper motor, which facilitates precise height adjustment of the display 200. In addition, when the power of the height-adjusting motor 450 (stepper motor) is off, an assembly of the height-adjusting motor 450 and the first height-adjusting transmission unit 430 (reduction gear) will be locked automatically. Thus, after ascending or descending the display 200, the height of the display 200 is able to be maintained when the power of the height-adjusting motor 450 is off.

It is noted that in this embodiment, the quantity of the height-adjusting modules 400 is two, but the disclosure is not limited to the quantity of the height-adjusting module 400. In other embodiments, the quantity of the height-adjusting module 400 may be one. In addition, the disclosure is not limited to the quantity of the height-adjusting guide slots 411 and the height-adjusting guide rods 421. In other embodiments, the quantity of the guide slot may be one, and the quantity of the height-adjusting guide rod may be one.

In addition, in this embodiment, the first height-adjusting transmission unit 430 is mounted on the main body 100 via the height-adjusting base 410, but the disclosure is not limited thereto. In other embodiments, the first angle-adjusting transmission unit 430 may be directly mounted on the main body 100.

As shown in FIG. 5, the stand 300 is pivoted to a side of the main body 100 away from the display 200, and the stand 300 is able to be rotated outwardly from the main body 100 or rotated inwardly to the main body 100. In detail, the stand 300 includes a plate body 310, a pivot seat 320 and two position restriction plates 330. One side of the plate body 310 is pivoted to the main body 100. The pivot seat 320 protrudes from a surface of the plate body 310 which is facing the main body 100. The two position restriction plates 330 are disposed on two opposite sides of the plate body 310, respectively. Each of the two position restriction plates 330 and the plate body 310 together define a mounting recess 340. That is, there are two mounting recesses 340.

In addition, the stand 300 has a plurality of rollers 350 located on a side of the stand 300 which is away from the main body 100. In detail, the rollers 350 are rotatably disposed on an edge of the plate body 310 which is away from the main body 100. When the stand 300 is abutted against a bearing surface (not shown), the stand 300 is abutted against the bearing surface via the rollers 350, allowing the friction between the stand 300 and the bearing surface may be reduced.

Moreover, the stand 300 further has a magnetic element 360. The magnetic element 360 is detachably attached to the main body 100. Thus, the stand 300 is able to be fixed to the back side of the main body 100 via the magnetic element 360 when the stand 300 is rotated inwardly to the main body 100.

Figure 6:
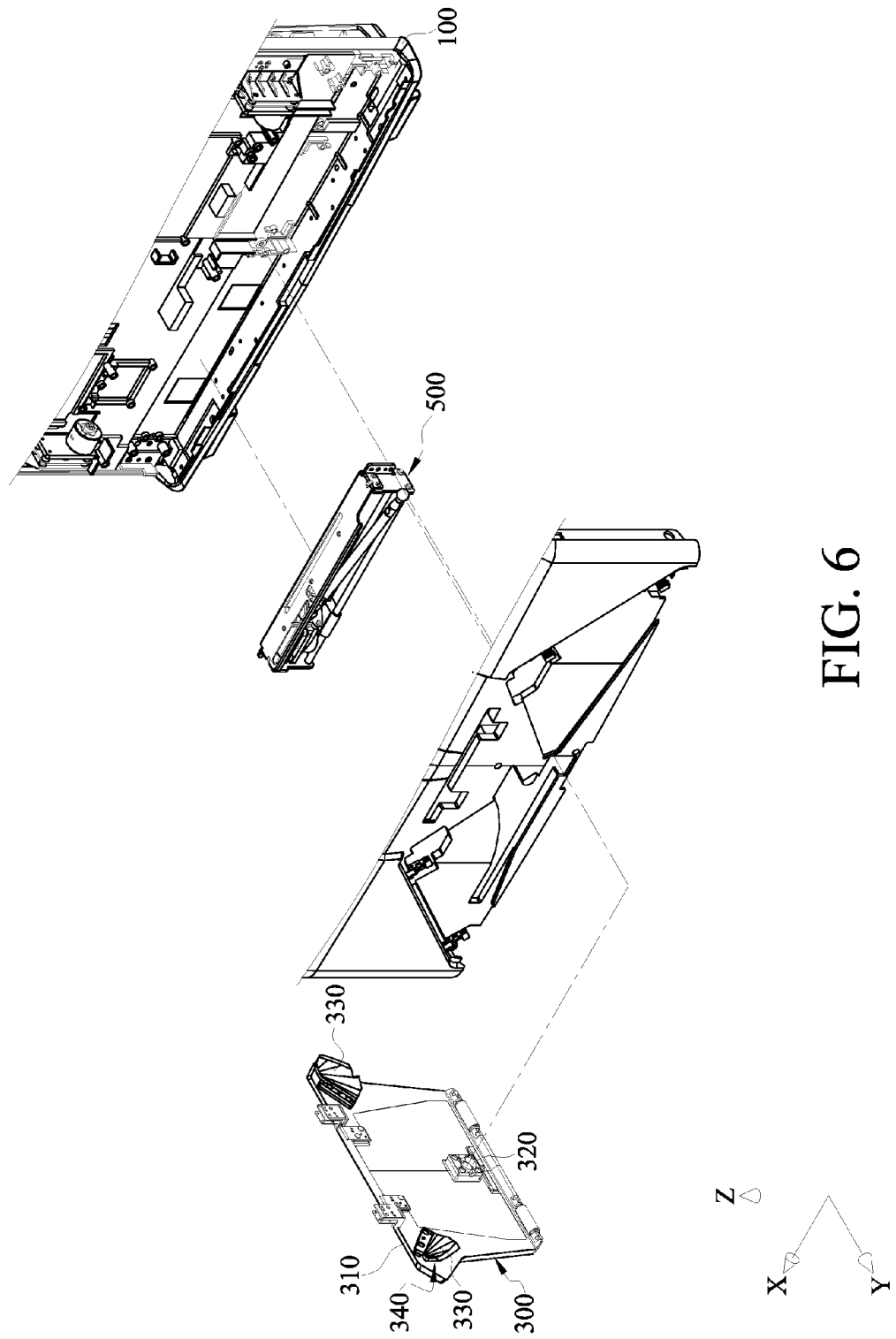
FIG. 6 is an exploded view of the main body, the stand and an angle-adjusting module shown in FIG. 5.
Figure 7:
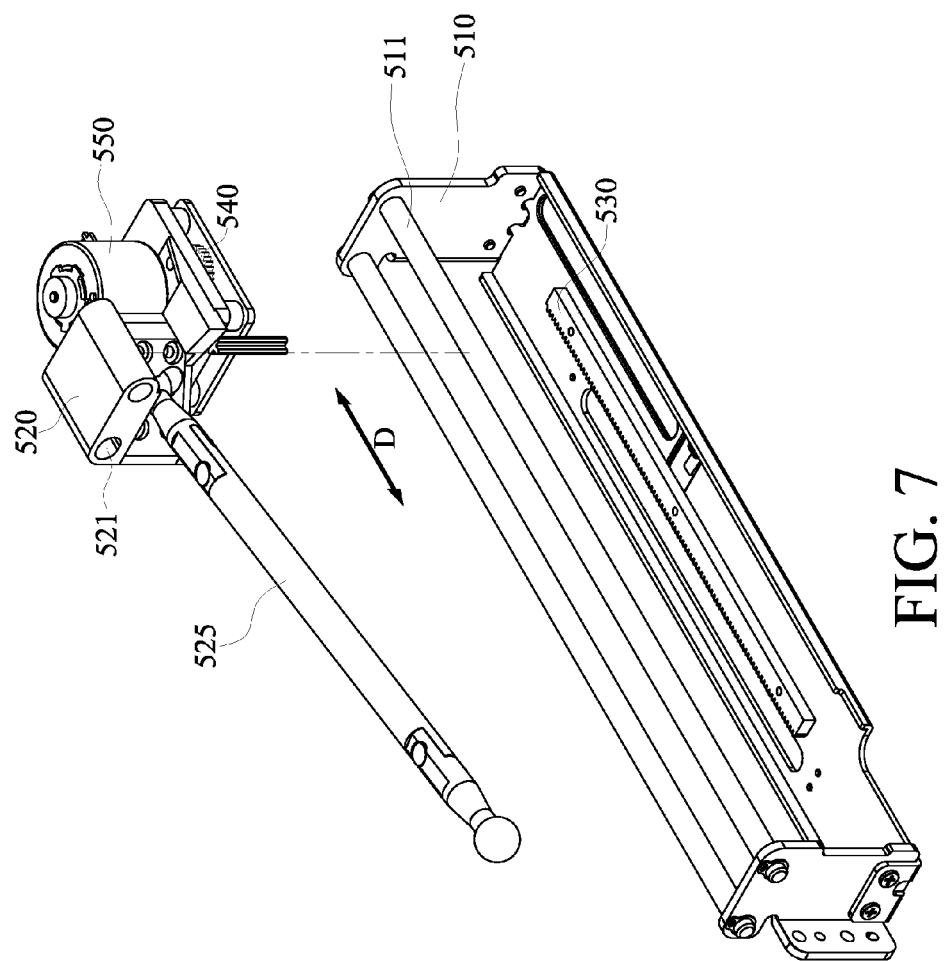
FIG. 7 is an exploded view of the angle-adjusting module shown in FIG. 6.

Please refer to FIG. 6 to FIG. 7. FIG. 6 is an exploded view of the main body, the stand and an angle-adjusting module shown in FIG. 5. FIG. 7 is an exploded view of the angle-adjusting module shown in FIG. 6.

The angle-adjusting module 500 includes an angle-adjusting base 510, a first sliding element 520, a linkage 525, a first angle-adjusting transmission unit 530, a second angle-adjusting transmission unit 540 and an angle-adjusting motor 550.

The angle-adjusting base 510 is fixed to the main body 100 and has a plurality of height-adjusting guide rods 511. The first sliding element 520 has a plurality of angle-adjusting guide slots 521. The plurality of height-adjusting guide rods 511 penetrate the plurality of angle-adjusting guide slots 521, respectively, allowing the first sliding element 520 to slide relative to the angle-adjusting base 510.

In this embodiment, the first sliding element 520 slides in a direction parallel to the bottom edge 110 of the main body 100. As shown in FIG. 7, the first sliding element 520 slides in a direction D parallel to the X-axis in order to improve the structural strength of the stand 300 for supporting the main body 100.

However, the disclosure is not limited to the sliding direction of the aforementioned first sliding element 520. In other embodiments, the first sliding element 520 is able to slide in the direction parallel to the Y-axis or the direction parallel to the Z-axis. To prevent an unexpected motion in a perpendicular direction, the first sliding element 520 may be equipped with an additional positioning mechanism if needed. Two opposite ends of the linkage 525 are pivoted to the first sliding element 520 and the pivot seat 320 of the stand 300, respectively. Specifically, one of the two opposite ends of the linkage 525 is pivoted to the first sliding element 520 via one universal joint, and the other one of the two opposite ends of the linkage 525 is pivoted to the pivot seat 320 of the stand 300 via another universal joint; therefore, the linkage 525 is able to be rotated to any desired angle with respect to the main body 100 or the stand 300.

The first angle-adjusting transmission unit 530 is a gear rack disposed on the angle-adjusting base 510. The second angle-adjusting transmission unit 540 is a reduction gear which is engaged with the gear rack (first angle-adjusting transmission unit 530). The second angle-adjusting transmission unit 540 is mounted on the first sliding element 520.

The angle-adjusting motor 550 is operatively connected to the second angle-adjusting transmission unit 540, such that the angle-adjusting motor 550 is able to drive the first sliding element 520 to slide relative to the main body 100 via the first angle-adjusting transmission unit 530 and the second angle-adjusting transmission unit 540, and thereby rotating the stand 300 relative to the main body 100 to adjust an inclined angle between the stand 300 and the main body 100 through the linkage 525.

Figure 8:
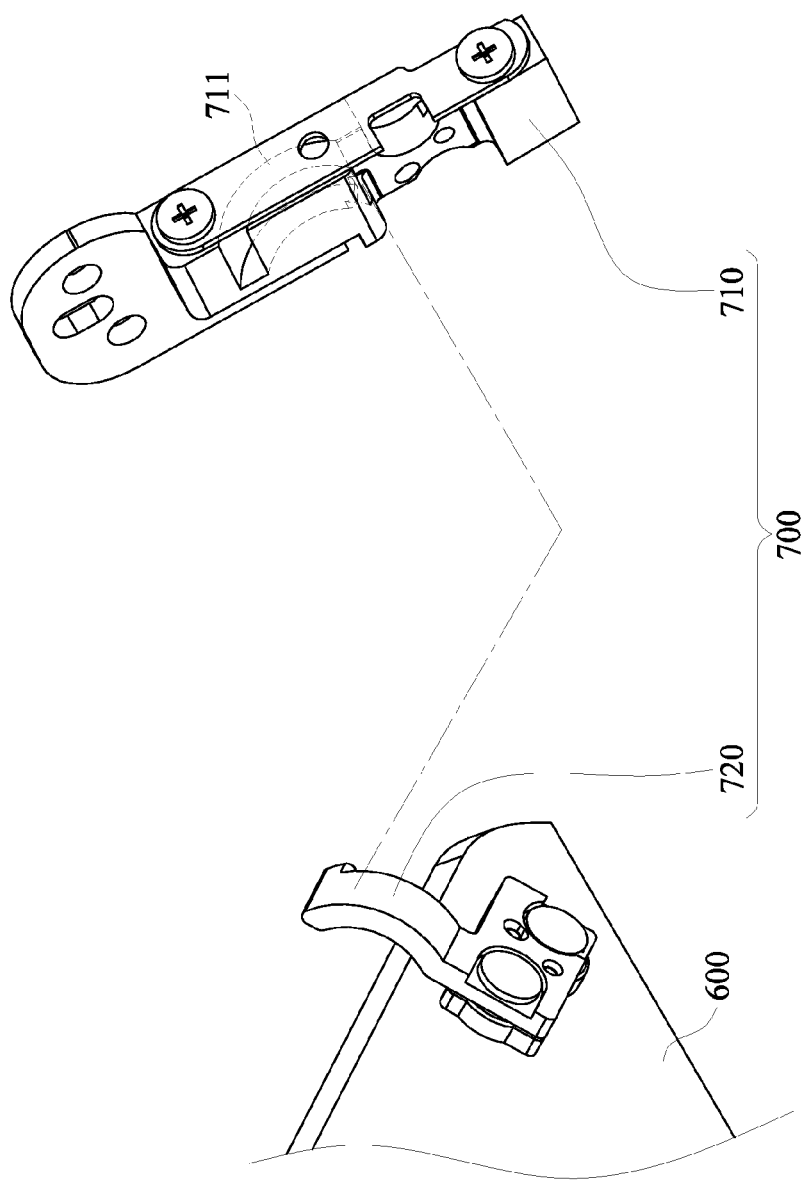
FIG. 8 is an enlarged view of a pivoting mechanism shown in FIG. 5.

Please refer to FIG. 5 and FIG. 8. FIG. 8 is an enlarged view of a pivoting mechanism shown in FIG. 5. The two covers 600 are assembled to two opposite sides of the stand 300. Specifically, each of the covers 600 has a first side 601 and a second side 603. The two first sides 601 of the covers 600 are pivoted to the main body 100 via two pivoting mechanisms 700, respectively, and the two second sides 603 of the covers 600 are movably assembled to the two mounting recesses 340 of the stand 300, respectively, allowing the covers 600 to be folded or unfolded relative to the main body 100 by the stand 300. The two covers 600 cover a space located between the stand 300 and the main body 100 for hiding the linkage 525 and the openings on the main body 100, thereby keeping an appearance of the electronic device 10 neat and beautiful.

In addition, in this embodiment, each of the two pivoting mechanisms 700 has a hidden pivoting mechanism. In detail, the pivoting mechanism 700 includes a pivoting body 710 and a curved pivot bar 720. The pivoting body 710 has a curved guide-slot 711. The curved pivot bar 720 is slidably disposed in the curved guide—slot 711 so as to rotate relative to the pivoting body 710. As the pivoting mechanism 700 has no fixed rotating axis, the stress concentrated on the rotating axis can be prevented, thereby prolonging the lifespan of the electronic device 10.

It is noted that in this embodiment, the quantity of the cover 600 is two, but the disclosure is not limited to the quantity of the cover 600. In other embodiments, the quantity of the cover 600 may be one.

Figure 9A:
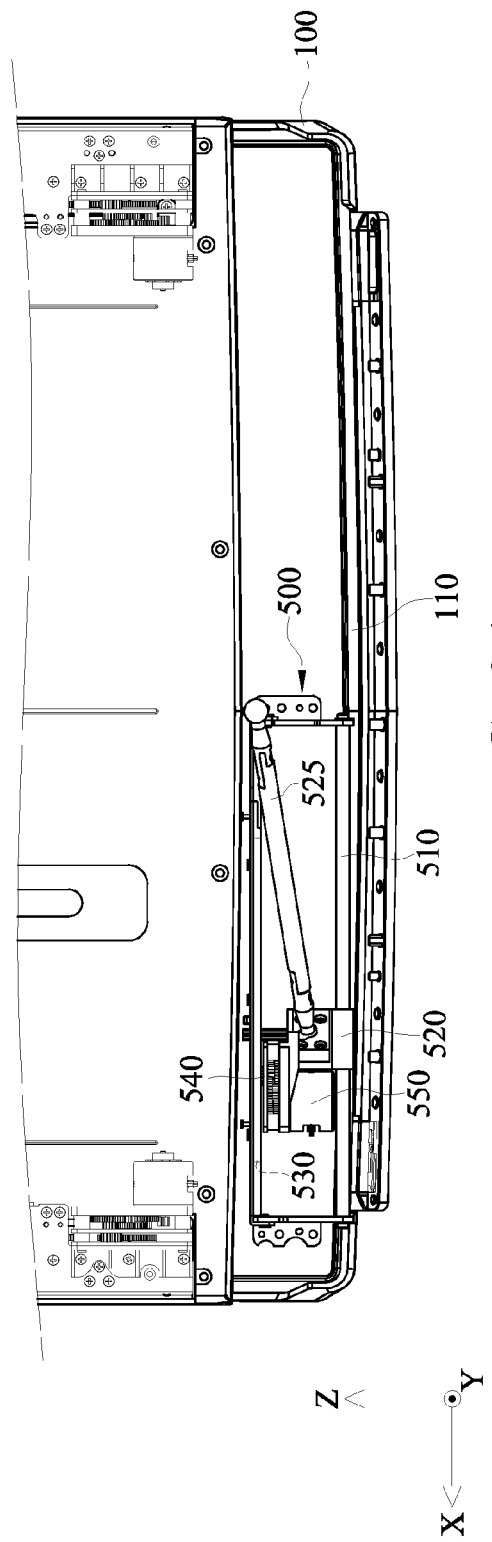
FIG. 9A to FIG. 10C are action views illustrating the adjustment of an inclined angle between the stand and the main body of the electronic device shown in FIG. 1.

Please refer to FIG. 1, and FIG. 9A to FIG. 10C. FIG. 9A to FIG. 10C are action views illustrating the adjustment of an inclined angle between the stand 300 and the main body 100 of the electronic device 10 shown in FIG. 1. In FIG. 9A and FIG. 10A, a part of the main body 100, the stand 300 and the covers 600, which covers the angle-adjusting module 500, are omitted for the purpose of observing the action of the angle-adjusting module 500 more clearly.

As shown in FIG. 1, the electronic device 10 is at a portable mode showing a compact state. In detail, the keyboard 20 is folded relative to the front side of the main body 100, and the stand 300 is stacked on the back side of the main body 100, allowing the electronic device 10 to be carried or stored easily when it is not in use.

Then, the steps of operating the stand on the electronic device 10 will be described below.

Figure 9B:
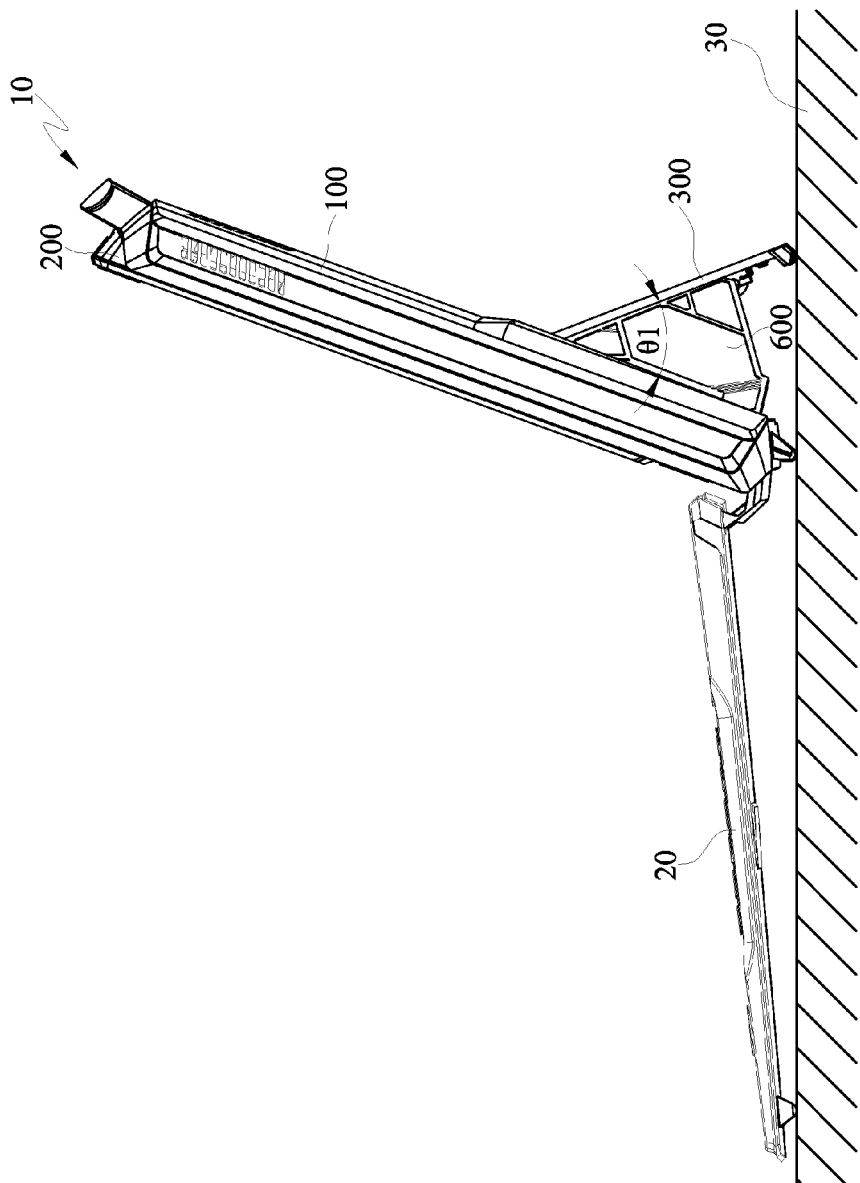
Figure 9C:
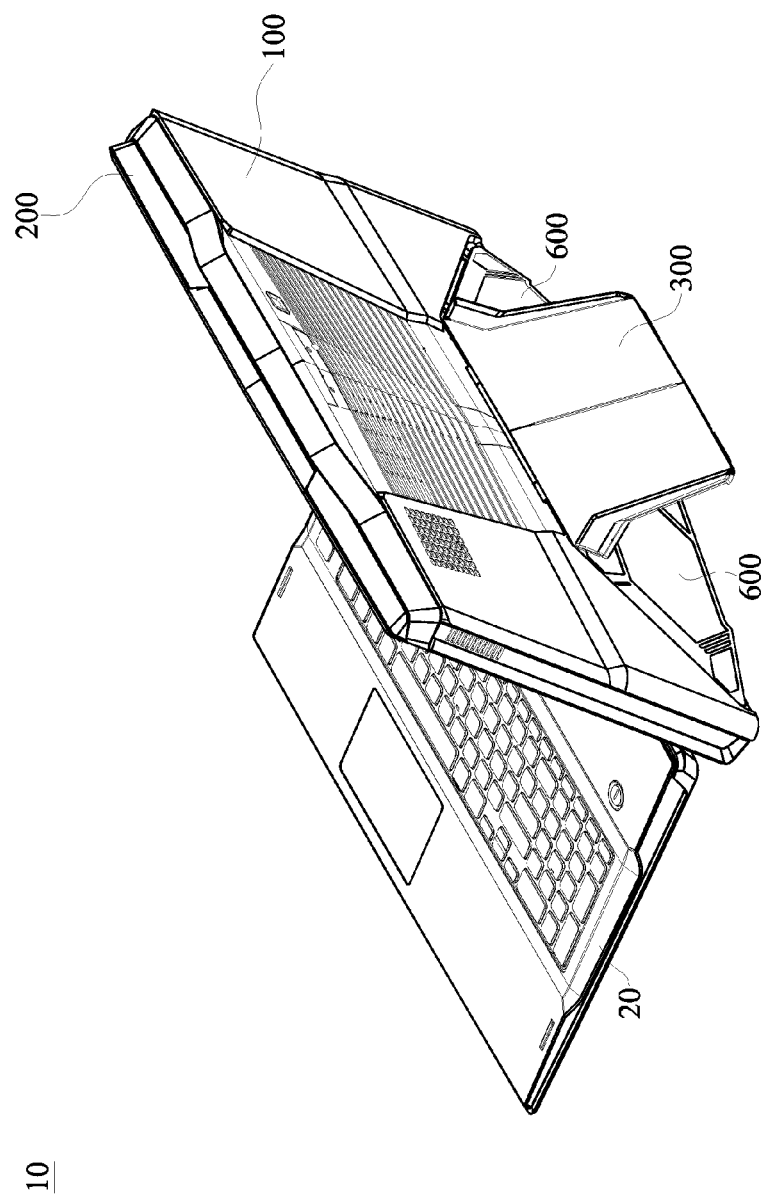

At first, the keyboard 20 is unfolded relative to the main body 100, and then an operating interface (e.g. a button on the keyboard 20 or a remote control) is used for controlling the stand 300 to be positioned at a first supporting position (as shown in FIG. 9A to FIG. 9C) so that the main body 100 is able to be put upon the bearing member 30.

In detail, as shown in FIG. 9A, the first sliding element 520 is located at the left portion of the first angle-adjusting base 510. The stand 300 is moved by the linkage 525, and an angle θ1 between the main body 100 and the stand 300 is at about 45 degrees (as shown in FIG. 9B). When the stand 300 is rotated outwardly from the main body 100 to the first supporting position, a side of each of the two covers 600 which is away from the stand 300 is constantly connected to the main body 100, and a side of each of the two covers 600 which is close to the stand 300 is moved away from the main body 100 with the stand 300, so that the two covers 600 are able to cover the space between the main body 100 and the stand 300 for hiding the linkage 525 and the openings on the main body 100, thereby keeping the appearance of the electronic device 10 neat and beautiful. (as shown in FIG. 9C).

Figure 10A:
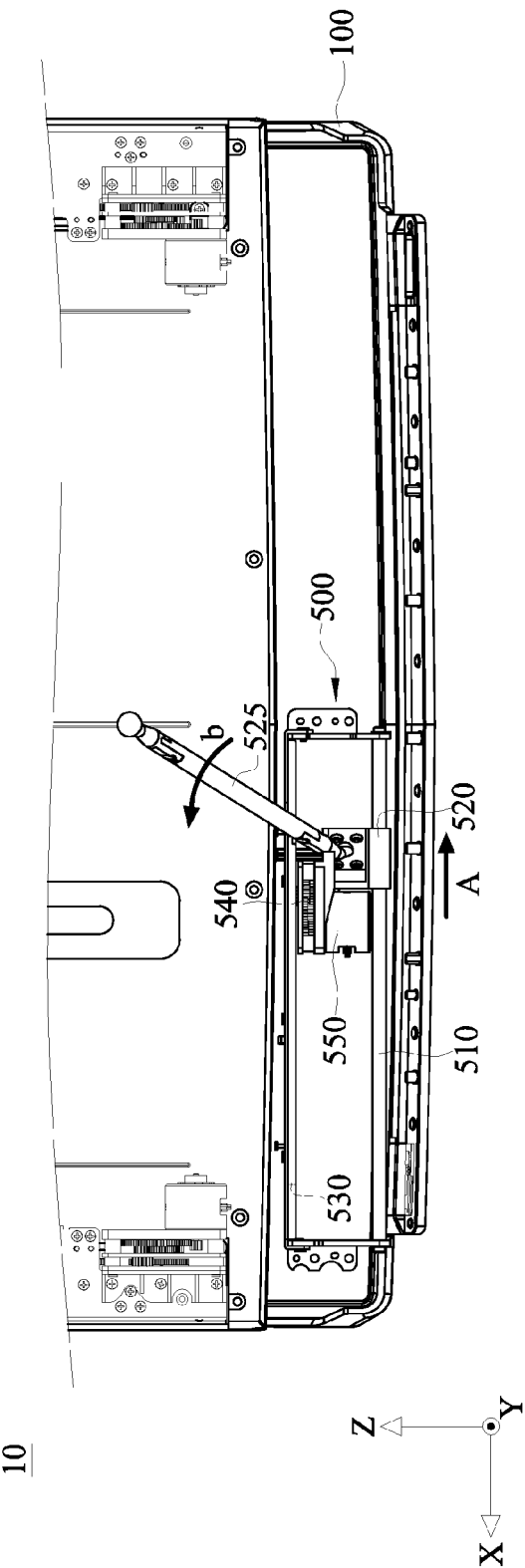
Figure 10B:
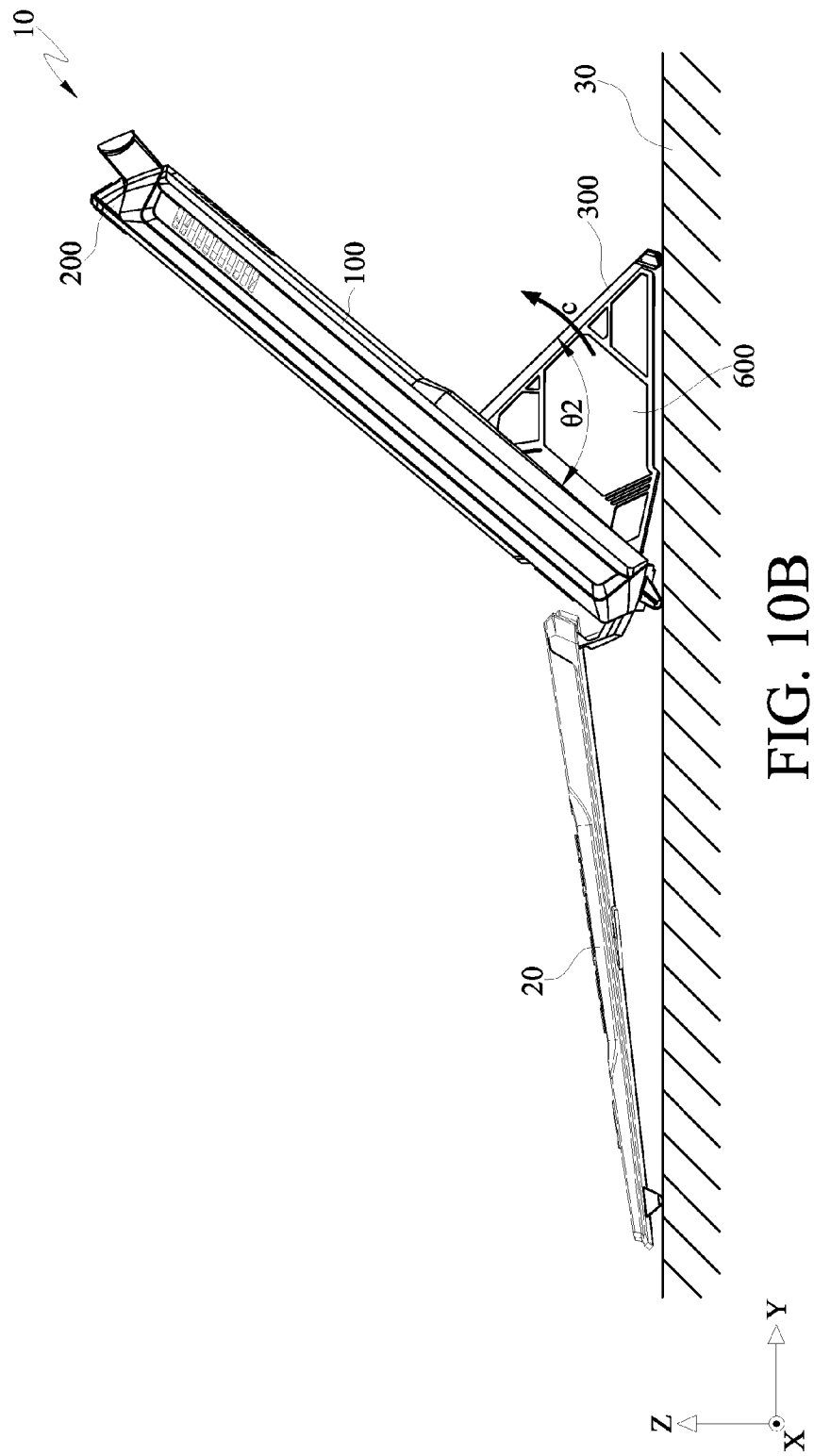

Second, as shown in FIG. 10A, the first sliding element 520 slides rightward in the direction of an arrow A by the control of the angle-adjusting motor 550. One end of the linkage 525 is pushed by the first sliding element 520, and the other end of the linkage 525 is restricted by the stand 300 so that the stand 300 is able to be rotated outwardly from the main body 100 by the movement of the linkage 525 and moved from the first supporting position to an second supporting position. When the stand 300 is at the second supporting position, an angle θ2 between the stand 300 and the main body 100 is at about 110 degrees (as shown in FIG. 10B), allowing the main body 100 to be placed in a more inclined position with respect to the bearing member 30. In other words, an angle between the main body 100 and the bearing member 30 becomes smaller.

Figure 10C:
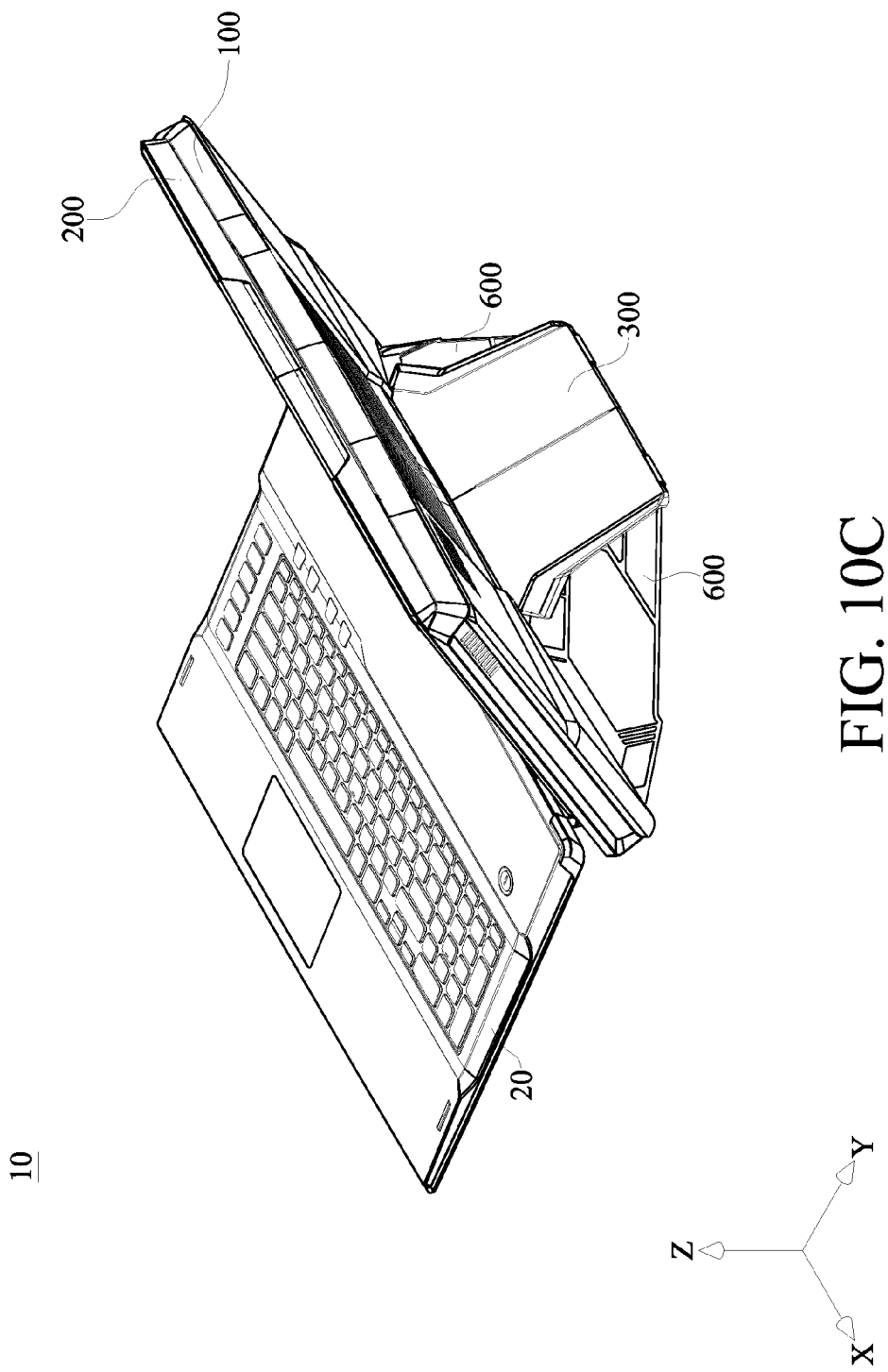

In addition, when the stand 300 is moved from the first supporting position to the second supporting position, one side of each of the two covers 600 which is away from the stand 300 is constantly connected to the main body 100, and the side of each of the two cover 600 close to the stand 300 is moved away from the main body 100 with the stand 300; thus the space between the main body 100 and the stand 300 is kept covered by the two covers 600 (as shown in FIG. 10C).

Figure 11:
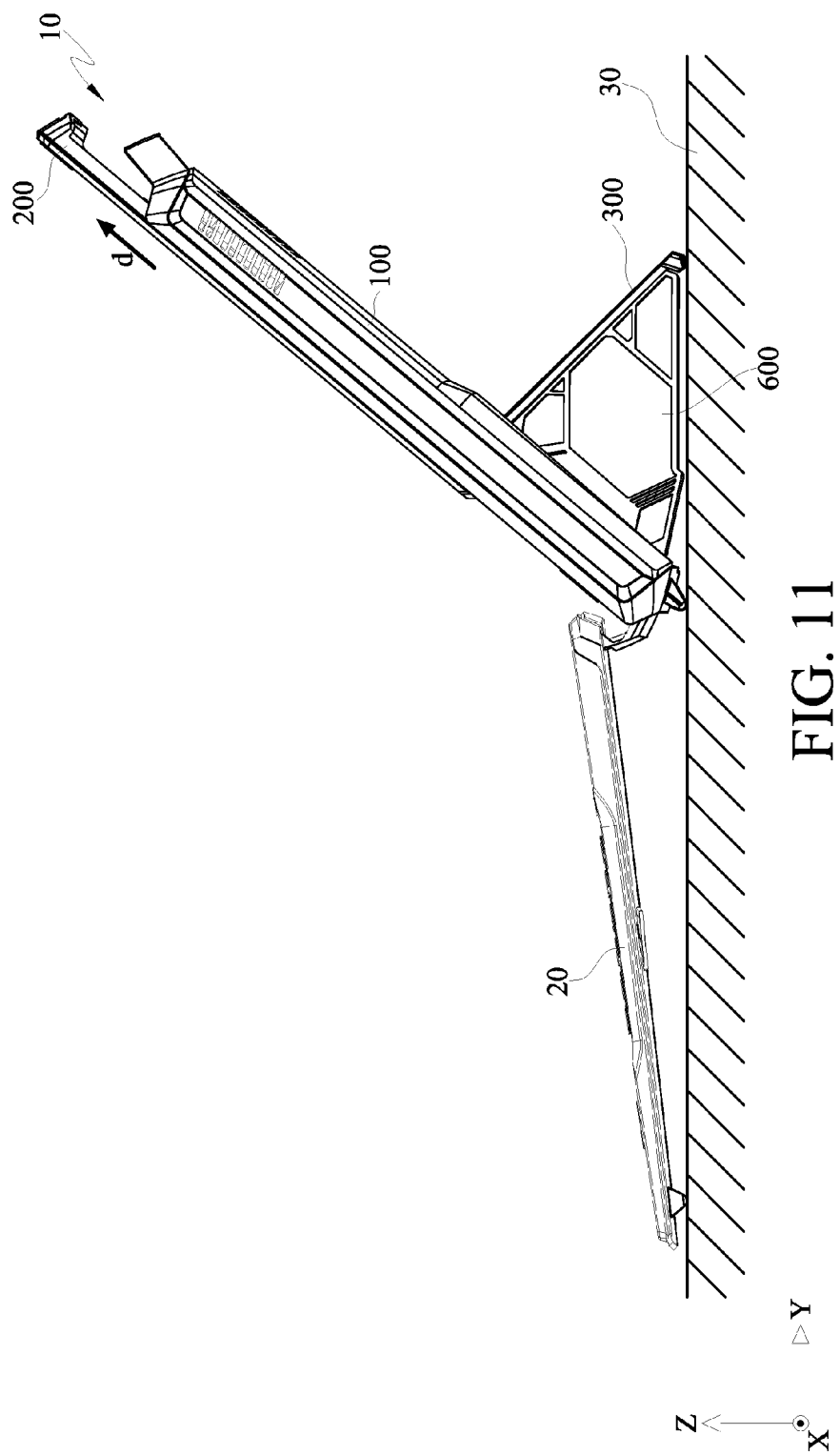
FIG. 11 is an action view illustrating the adjustment of the height of the display of the electronic device shown in FIG. 1.

Please refer to FIG. 11, which is an action view illustrating the adjustment of the height of the display of the electronic device shown in FIG. 1.

As shown in FIG. 11, the display 200 is able to be ascended by the height-adjusting motor 450 for the comfort of users to view the display. Moreover, the display is able to be descended by the height-adjusting motor 450.

According to the electronic device as discussed above, the angle-adjusting module driven by the angle-adjusting motor is able to adjust the inclined angle between the stand and the main body, and the height-adjusting module driven by the height-adjusting motor is able to adjust the height of the display, thereby improving the convenience of adjusting the stand and providing a more comfortable way for using the electronic device.

In addition, because the angle-adjusting module and the height-adjusting module are driven by the stepper motors, and the assemblies of the stepper motors and the reduction gears will be locked automatically by the self-locking of the two stepper motors, the position of the display is able to be maintained by shutting down the power of the stepper motors, thereby maintaining a desired angle between the stand and the bearing surface and a desired height of the display with respect to the bearing surface.

Furthermore, because one side of each of the two covers is pivoted to the main body via the aforementioned hidden pivoting mechanism, and the other side of each of the two covers is moveably assembled to the stand, the two covers are able to be moved with the stand and cover the space located between the main body and the stand during the rotation of the stand. Therefore, the two covers keep the appearance of the electronic device neat and beautiful.

What is claimed is:

1. An electronic device, comprising:
a main body; a display slidably disposed on the main body; a stand pivoted to the main body; at least one height-adjusting module disposed on the main body and connected to the display for ascending and descending the display relative to the main body; and an angle-adjusting module, comprising: a first sliding element slidably disposed on the main body; a linkage having two ends which are opposite to each other, the two ends pivoted to the first sliding element and the stand, respectively;
a first angle-adjusting transmission unit and a second angle-adjusting transmission unit disposed on the main body and the first sliding element, respectively, and the first angle-adjusting transmission unit and the second angle-adjusting transmission unit engaged with each other; and an angle-adjusting motor operatively connected to the second angle-adjusting transmission unit, when the angle-adjusting motor drives the first sliding element to slide relative to the main body through the first angle-adjusting transmission unit and the second angle-adjusting transmission unit, the linkage rotates the stand relative to the main body for adjusting an inclined angle between the stand and the main body.

2. The electronic device according to claim 1, wherein the angle-adjusting module further comprises an angle-adjusting base mounted on the main body, the first angle-adjusting transmission unit is disposed on the main body via the angle-adjusting base, the angle-adjusting base has at least one height-adjusting guide rod, the first sliding element has at least one angle-adjusting guide slot, the at least one height-adjusting guide rod penetrates the at least one angle-adjusting guide slot such that the first sliding element is slidable relative to the main body through the at least one height-adjusting guide rod and the at least one angle-adjusting guide slot.

3. The electronic device according to claim 2, wherein the first angle-adjusting transmission unit is a gear rack fixed to the angle-adjusting base, the second angle-adjusting transmission unit is a gear, the angle-adjusting motor is operatively connected to the second angle-adjusting transmission unit such that the second angle-adjusting transmission unit is rotatably disposed on the first sliding element.

4. The electronic device according to claim 2, wherein the first angle-adjusting transmission unit is a gear rack fixed to the angle-adjusting base, the second angle-adjusting transmission unit is a reduction gear, the angle-adjusting motor is operatively connected to the second angle-adjusting transmission unit, such that the second angle-adjusting transmission unit is rotatably disposed on the first sliding element.

5. The electronic device according to claim 2, wherein the at least one height-adjusting module comprises a second sliding element, a first height-adjusting transmission unit, a second height-adjusting transmission unit and a height-adjusting motor, the second sliding element fixed to the display is slidably disposed on the main body, the first height-adjusting transmission unit and the second height-adjusting transmission unit are disposed on the main body and the second sliding element, respectively, and are engaged with each other, the height-adjusting motor is operatively connected to the first height-adjusting transmission unit, when the height-adjusting motor slides the second sliding element relative to the main body through the first height-adjusting transmission unit and the second height-adjusting transmission unit, the display is ascended or descended relative to the main body.

6. The electronic device according to claim 5, wherein the angle-adjusting motor and the height-adjusting motor are stepper motors.

7. The electronic device according to claim 5, wherein the at least one height-adjusting module further comprises a height-adjusting base, the height-adjusting base is mounted on the main body, the first height-adjusting transmission unit is disposed on the main body via the height-adjusting base, the height-adjusting base has at least one height-adjusting guide slot, the second sliding element has at least one height-adjusting guide rod, the at least one height-adjusting guide rod penetrates the at least one height-adjusting guide slot such that the second sliding element is slidable relative to the main body through the at least one height-adjusting guide rod and the at least one height-adjusting guide slot.

8. The electronic device according to claim 7, wherein the first height-adjusting transmission unit is a gear, the second height-adjusting transmission unit is a gear rack fixed to the second sliding element, the height-adjusting motor is operatively connected to the first height-adjusting transmission unit such that the first height-adjusting transmission unit is rotatable relative to the height-adjusting base.

9. The electronic device according to claim 7, wherein the first height-adjusting transmission unit is a reduction gear, the second height-adjusting transmission unit is a gear rack fixed to the second sliding element, the height-adjusting motor is operatively connected to the first height-adjusting transmission unit such that the first height-adjusting transmission unit is rotatable relative to the height-adjusting base.

10. The electronic device according to claim 1, wherein a quantity of the at least one height-adjusting module is two, and the two height-adjusting modules are located on two sides of the display which are opposite to each other, respectively.

11. The electronic device according to claim 1, wherein the stand has at least one roller located on a side of the stand away from the main body.

12. The electronic device according to claim 1, wherein the first sliding element has a sliding direction parallel to an extending direction of a bottom edge of the main body.

13. The electronic device according to claim 1, wherein the stand further has at least one magnetic element, and the at least one magnetic element is detachably attached to the main body.

14. The electronic device according to claim 1, further comprising at least one cover, the stand having at least one mounting recess, one side of the at least one cover pivoted to the main body, another side of the at least one cover movably assembled to the at least one mounting recess of the stand such that the at least one cover is foldable relative to the main body by the stand.

15. The electronic device according to claim 14, wherein the quantity of the at least one cover is two, the stand is located between the two covers, the quantity of the at least one mounting recess is two, each of the two covers has a first side and a second side, the two first sides of the two covers pivot to two sides of the main body which are opposite to each other, respectively, the two second sides of the two covers are movably assembled to the two mounting recesses of the stand, respectively.

16. An electronic device, comprising:
a main body; a display slidably disposed on the main body; a stand pivoted to the main body; and
an angle-adjusting module, comprising: a first sliding element slidably disposed on the main body; a linkage having two ends which are opposite to each other, the two ends of the linkage pivoted to the first sliding element and the stand, respectively; a first angle-adjusting transmission unit and a second angle-adjusting transmission unit disposed on the main body and the first sliding element, respectively, and the first angle-adjusting transmission unit and the second angle-adjusting transmission unit engaged with each other; and an angle-adjusting motor is operatively connected to the second angle-adjusting transmission unit, when the angle-adjusting motor drives the first sliding element to slide relative to the main body through the first angle-adjusting ransmission unit and the second angle-adjusting transmission unit, the linkage rotates the stand relative to the main body for adjusting an inclined angle between the stand and the main body.

17. The electronic device according to claim 16, wherein the angle-adjusting module further comprises an angle-adjusting base mounted on the main body, the first angle-adjusting transmission unit is disposed on the main body by the angle-adjusting base, the angle-adjusting base has at least one first height-adjusting guide rod, the first sliding element has at least one angle-adjusting guide slot, the at least one first height-adjusting guide rod penetrates the at least one angle-adjusting guide slot such that the first sliding element is slidable relative to the main body through the at least one first height-adjusting guide rod and the at least one angle-adjusting guide slot.

18. The electronic device according to claim 17, wherein the first angle-adjusting transmission unit is a gear rack fixed to the angle-adjusting base, the second angle-adjusting transmission unit is a gear, the angle-adjusting motor is operatively connected to the second angle-adjusting transmission unit such that the second angle-adjusting transmission unit is rotatably disposed on the first sliding element.

19. The electronic device according to claim 17, wherein the first angle-adjusting transmission unit is a gear rack fixed to the angle-adjusting base, the second angle-adjusting transmission unit is a reduction gear, the angle-adjusting motor is operatively connected to the second angle-adjusting transmission unit such that the second angle-adjusting transmission unit is rotatably disposed on the first sliding element.

20. The electronic device according to claim 16, further comprising at least one cover, the stand having at least one mounting recess, one side of the cover pivoted to the main body, another side of the cover movably assembled to the at least one mounting recess of the stand, such that the at least one cover is foldable relative to the main body by the stand.

21. The electronic device according to claim 20, wherein the quantity of the at least one cover is two, the stand is located between the two covers, the quantity of the at least one mounting recess is two, each of the two covers has a first side and a second side, the two first sides of the two covers pivot to two sides of the main body which are opposite to each other, respectively, the two second sides of the two covers are movably assembled to the two mounting recesses of the stand, respectively.

\* \* \* \* \*